Patented Dec. 25, 1934

1,985,572

UNITED STATES PATENT OFFICE 1,985,572

ROAD BUILDING COMPOSITION AND METHOD OF PREPARING SAME

David W. Johnston, Vancouver, British Columbia, Canada, assignor, by mesne assignments, to The Flintkote Company, New York, N. Y., a corporation of Massachusetts No Drawing. Application July 18, 1930, Serial No. 469,002

5 Claims. (Cl. 106—31)

This invention relates to paving or like structures and is particularly concerned with improvements in asphaltic concrete and methods of preparing the same from mixtures of mineral aggregate and bituminous emulsions.

Attempts have heretofore been made to produce asphaltic concrete mixtures by combining mineral aggregate of suitable grades with aqueous emulsions of bitumen such as asphalt or the like, the mix usually being prepared at the locality or point where it is to be applied and employing predetermined quantities of the mineral aggregate and bituminous emulsion. The asphaltic concrete is generally prepared by placing the desired predetermined quantities of mineral aggregate in a mixer of the cement mixer type and adding the appropriate quantities of bituminous emulsion to the mass of aggregate in the mixer and continuing the operation of the mixer for a substantial period of time until the mixture is more or less uniform and until the mineral aggregate becomes coated with the bitumen. The relative proportions of mineral aggregate and bituminous emulsion are predetermined to give the proper bonding and adhesive action between the mineral aggregate and to form a more or less dense structure sufficient to withstand traffic. In preparing asphaltic concrete according to this method it has been found in practise that where the total predetermined quantity of emulsion is added to the entire mass of mineral aggregate, generally consisting of crushed stone and sand, the resultant mixture exhibits incomplete coating of the stone particles, a considerable quantity of these being incompletely coated and some of them being almost entirely uncoated. This is believed to be due to the fact that the emulsions generally employed for this purpose are quite unstable to electrolytes, fine mineral aggregate and to mechanical action. As a result, when these emulsions are mixed with crushed stone in the presence of fine mineral aggregate and subjected to mechanical mixing action for the production of an asphaltic concrete, the emulsion breaks rapidly and forms globes or balls with the fine mineral aggregate thus precluding the complete and proper coating of the stone particles and the formation of a uniform mixture of spreadable consistency.

The principal object of the invention is to provide improvements in the preparation of asphaltic concrete of the character described wherein the stone particles will be completely covered with bitumen and with a coating of sand, firmly adherent to the stone and completely coated with bitumen, the mixture containing bituminous emulsion to provide the requisite cold working properties.

According to the preferred method of carrying out my present invention, desired predetermined quantities of crushed stone or gravel are placed in the mixer, whereupon a portion of a predetermined quantity of the bituminous emulsion is added thereto and the mixer continued in operation for a short period of time sufficient to cause the emulsion to break and all particles of the stone to be thoroughly coated with bitumen. Thereupon fine mineral aggregate such as sand, in predetermined quantities suitable for the making of an asphaltic concrete, is added to the mixer while it is in motion, and after a brief period of time the balance of the predetermined quantities of the bituminous emulsion is poured into the mixer. The mixer is then continued in operation for a short period of time to produce the final mixture of completely asphalt coated aggregate, containing the further quantities of emulsion in proportions such as to form an aqueous mortar mixture about the coarse aggregate, and the emulsion remaining in an unbroken condition to provide the cold working properties of the completed composition.

In carrying out my invention the bituminous emulsion is preferably one of a more or less unstable character such that, while sufficiently stable to withstand storage and shipment from the point of manufacture of the emulsion to its use for preparing the asphaltic concrete in accordance with the invention, it is nevertheless of such a degree of unstability as to enable it to be more or less rapidly broken when admixed with mineral aggregate under the mechanical mixing action. For this purpose, the emulsion may consist of any suitable grade of bitumen such for example as Mexican asphalt from 110° to 150° F. melting point and a penetration of 50 to 100 at 77° F., emulsified in water with a soap or soap-like material formed from a saponifiable substance such as oleic acid and alkali or their equivalents. The ingredients are preferably of such character and are employed in such proportion as to produce an emulsion which is liquid in the cold and pours readily and in which the soap or other emulsifying agent comprises not substantially in excess 3% by weight of the asphalt, the emulsion containing not substantially in excess of 50% of water.

The coarse mineral aggregate, such as crushed stone, may consist of various grades of sizes but preferably will be such that an average analysis thereof will be substantially as follows:

| | Per cent |
|---|---|
| Retained on a 1" screen | 8.4 |
| Retained on a ¾" screen | 50 |
| Retained on a ⅜" screen | 97.7 |
| Retained on a ¼" screen | 99.7 |

The sand employed in making the asphaltic concrete according to my invention may likewise vary in degrees of fineness. Where a fine sand is desired this may be of the character to show an average analysis as follows:

| | Per cent |
|---|---|
| Retained on a No. 4 mesh screen | Nil |
| Retained on a No. 8 mesh screen | Nil |
| Retained on a No. 16 mesh screen | 1 |
| Retained on a No. 30 mesh screen | 3½ |
| Retained on a No. 50 mesh screen | 75 |
| Retained on a No. 100 mesh screen | 99 | with a modulus of fineness of 1.8.

Where a somewhat coarser sand is desired this may be of such character to show an average analysis as follows:

| | Per cent |
|---|---|
| Retained on a No. 4 mesh screen | 1 |
| Retained on a No. 8 mesh screen | 11 |
| Retained on a No. 16 mesh screen | 21.5 |
| Retained on a No. 30 mesh screen | 58.5 |
| Retained on a No. 50 mesh screen | 84 |
| Retained on a No. 100 mesh screen | 96.5 | with a modulus of fineness of 2.72.

In the practical embodiments of the invention, and utilizing crushed stone and fine sand of the character above indicated and an emulsion of asphalt as above specified, the relative proportions by weight of the ingredients may be substantially as follows:

| | Per cent |
|---|---|
| Crushed stone | 55 to 80 |
| Sand | 10 to 35 |
| Bituminous emulsion | 7 to 10 |

To produce the asphaltic concrete according to my invention with the ingredients of the character and in proportions specified, the entire mass of crushed stone is first placed in the mixer and while the latter is continued in operation approximately 25 to 30% of the above indicated relative quantities of the emulsion are poured into the mixer and subjected to the action thereof in admixture with the stone for approximately 25 to 40 seconds. This period of time, with the material as specified, may vary considerably but in any event should be sufficient to cause the emulsion to be completely broken and all of the particles of stone to be thoroughly coated with asphalt. The asphalt coated stone is then in prime condition for the reception of the mortar forming constituents. Thereupon the measured quantity of the sand may be introduced into the mixer while the latter is still in motion and after a few revolutions of the drum to effect distribution of the sand throughout the mass of stone, the balance of the emulsion, representing from 70 to 75% of the predetermined relative quantities as above specified, may be poured into the mixer and the latter kept in motion for an additional short period of time approximating 40 to 60 seconds. The resultant mixture comprises a completely asphalt coated aggregate and as withdrawn from the mixer contains sufficient unbroken emulsion to lubricate the mix and preserve the cold working properties thereof.

The asphaltic concrete mixture as thus prepared may be distributed over a suitable foundation and raked into place and immediately rolled with a heavy roller in order to compact the mass and produce a dense, tough mastic which sets within approximately one hour to an extent sufficient to resist displacement under traffic. Any suitable foundation may be employed in conjunction with the asphaltic concrete prepared in accordance with the invention and may, for example, consist of a compact water-bound macadam averaging from 3 to 3½" in thickness.

An incidental and particularly noteworthy advantage of my invention resides in its applicability to the preparation of asphaltic concrete with moist or wet mineral aggregate. In this case the predetermined quantities of moist or wet crushed stone are placed in the mixer, and approximately 40% of the predetermined quantity of emulsion apportioned for the batch is added to the stone in the mixer and the mixer continued in operation for approximately 40 to 60 seconds. This increased period of time of initial mixing of emulsion with the crushed stone is desirable since ordinarily the breaking of emulsion is slightly slower for wet rock than for dry rock. The sand in quantities predetermined for the batch is then added, as heretofore described, to the asphalt coated stone and after several revolutions of the mixing drum the balance of the emulsion is poured into the mixer and the latter kept in operation for an additional 40 to 60 seconds.

In some instances it may be desirable to employ emulsions of asphalt of different penetration for the several stages as herein described. Thus, by using an emulsion of relatively soft material for the initial coating of the crushed stone, more rapid wetting of the stone may be secured, whereby the coating of the stone and adhesion of the asphalt to the stone may be improved. Likewise, the emulsions employed at the several stages as described may be of different degrees of stability. Thus, the emulsion for initially coating the stone may be of a relatively lower degree of stability than that used in the subsequent formation of the aqueous mortar mixture about the coated stone.

While I prefer to employ an aqueous emulsion as herein set forth, in the initial step of coating the coarse aggregate with bitumen, I should also regard it as within the scope of my invention to employ for this purpose such substances as fuel oil, or a solution of asphalt or similar material dissolved in a suitable solvent, or even molten bitumen.

It should be further understood that while I prefer to follow the initial step of coating the coarse aggregate with the addition of the fine mineral aggregate such as sand, followed by the addition of the further quantities of emulsion, this order of steps for introducing the mortar mixture may be reversed. In some instances, also, the appropriate quantities of sand and emulsion may be separately premixed and the mixture then combined with the coated coarse aggregate.

Having thus described my invention it will be apparent to those skilled in the art that numerous variations and changes may be made therein without departing from the spirit of the invention as set forth in the appended claims.

I claim as my invention:

1. The method of preparing asphaltic concrete for roads or the like, which comprises mixing an aqueous emulsion of bitumen with relatively coarse mineral aggregate and agitating the mixture to cause the emulsion to be substantially completely broken and the aggregate to be thoroughly coated with the bitumen, then introducing relatively fine mineral aggregate and an aqueous emulsion of bitumen to the mass of coated relatively coarse mineral aggregate and distributing the same through the mass of coated coarse aggregate without substantially breaking said emulsion to form an aqueous mortar mixture about the coarse aggregate.

2. In the method of preparing asphaltic concrete for roads or the like, from predetermined relative quantities of mineral aggregate and an aqueous emulsion of bitumen, the improvement consisting in the steps of first mixing a predetermined quantity of relatively coarse mineral aggregate with an aqueous emulsion of bitumen and effecting a breaking of the emulsion to cause the bitumen thoroughly to coat the aggregate, then adding predetermined quantities of relatively fine mineral aggregate and causing the latter to be completely distributed through the mass, then mixing the mass thus formed with further predetermined quantities of an aqueous emulsion of bitumen, and agitating to form an aqueous bituminous mortar mixture about the coated aggregate and containing said last named quantities of emulsion in substantially unbroken condition.

3. An asphaltic concrete composition comprising relatively coarse mineral aggregate substantially completely coated with bitumen and an aqueous mortar composed of fine mineral aggregate and an aqueous emulsion of bitumen, the emulsion of the mortar being in unbroken condition to provide cold working properties for the composition.

4. An asphaltic concrete composition comprising relatively coarse mineral aggregate substantially completely coated with bitumen deposited from an aqueous emulsion thereof, and an aqueous mortar composed of fine mineral aggregate and an aqueous emulsion of bitumen, the emulsion of the mortar being in unbroken condition to provide cold working properties for the composition.

5. The method of preparing asphaltic concrete for roads or the like, which comprises mixing an aqueous emulsion of bitumen with relatively coarse mineral aggregate and agitating the mixture to cause the emulsion to be substantially completely broken and the aggregate to be thoroughly coated with the bitumen, then introducing relatively fine mineral aggregate and an aqueous emulsion of bitumen to the mass of coated relatively coarse mineral aggregate and distributing the same through the mass of coated coarse aggregate without substantially breaking the emulsion to form an aqueous mortar mixture about the coarse aggregate, the bitumen of the second-named emulsion being harder than that of the first-named emulsion.

DAVID W. JOHNSTON.